US012619182B2

(12) United States Patent
Inuzuka

(10) Patent No.: US 12,619,182 B2
(45) Date of Patent: May 5, 2026

(54) IMAGE FORMING APPARATUS INCLUDING CLUTCH TO SWITCH TRANSMISSION OF DRIVING FORCE

(71) Applicant: BROTHER KOGYO KABUSHIKI KAISHA, Nagoya (JP)

(72) Inventor: Mikio Inuzuka, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/899,455

(22) Filed: Sep. 27, 2024

(65) Prior Publication Data

US 2025/0021040 A1 Jan. 16, 2025

Related U.S. Application Data

(63) Continuation of application No. PCT/JP2023/012457, filed on Mar. 28, 2023.

(30) Foreign Application Priority Data

Apr. 1, 2022 (JP) ................................ 2022-061737

(51) Int. Cl.
*G03G 15/08* (2006.01)
*G03G 15/00* (2006.01)
(Continued)

(52) U.S. Cl.
CPC ..... *G03G 15/5012* (2013.01); *G03G 15/0863* (2013.01); *G03G 15/0865* (2013.01);
(Continued)

(58) Field of Classification Search
CPC ............... G03G 15/08; G03G 15/0863; G03G 15/0865; G03G 15/087; G03G 15/5012;
(Continued)

(56) References Cited

U.S. PATENT DOCUMENTS

2018/0181030 A1 6/2018 Tanaka et al.
2019/0258190 A1 8/2019 Mizuno et al.
(Continued)

FOREIGN PATENT DOCUMENTS

JP 6-208263 A 7/1994
JP 9-127824 A 5/1997
(Continued)

OTHER PUBLICATIONS

International Preliminary Report on Patentability issued in the corresponding International Application No. PCT/JP2023/012457, Sep. 24, 2024.

(Continued)

*Primary Examiner* — Sophia S Chen
(74) *Attorney, Agent, or Firm* — Merchant & Gould P.C.

(57) ABSTRACT

An image forming apparatus includes: a main housing having a supply section opening, the main housing including: a first conveying roller which conveys a sheet; and a supply section cover which opens and closes the supply section opening and which is movable between a cover opened position at which the supply section cover is opened and a cover closed position at which the supply section cover is closed; a process unit including: a process housing to accommodate toner; a developing roller; and an agitating member which agitates the toner in the process housing; a toner cartridge which is attached to and detached from the process unit through the supply section opening and which supplies the toner to the process unit, the toner cartridge having at least a part being exposed outside the main housing in a state of the toner cartridge being attached to the process unit; and a controller.

13 Claims, 12 Drawing Sheets

(51) Int. Cl.
*G03G 21/16* (2006.01)
*G03G 21/18* (2006.01)

(52) U.S. Cl.
CPC ....... *G03G 15/087* (2013.01); *G03G 15/6529* (2013.01); *G03G 21/1633* (2013.01); *G03G 21/1814* (2013.01); *G03G 21/1857* (2013.01)

(58) Field of Classification Search
CPC .... G03G 15/6529; G03G 21/14; G03G 21/16; G03G 21/1633; G03G 21/1647; G03G 21/18; G03G 21/1814; G03G 21/1857
See application file for complete search history.

(56) References Cited

U.S. PATENT DOCUMENTS

| | | | |
|---|---|---|---|
| 2021/0109457 | A1 | 4/2021 | Wada et al. |
| 2021/0263448 | A1 | 8/2021 | Lee et al. |
| 2021/0405552 | A1 | 12/2021 | Sato et al. |
| 2021/0405555 | A1 | 12/2021 | Ogawa et al. |
| 2021/0405574 | A1 | 12/2021 | Wada et al. |
| 2021/0405577 | A1 | 12/2021 | Noguchi et al. |
| 2022/0155708 | A1 | 5/2022 | Sato et al. |
| 2024/0231258 | A1* | 7/2024 | Suetsugu ........... G03G 15/0889 |

FOREIGN PATENT DOCUMENTS

| | | | |
|---|---|---|---|
| JP | 2012-247699 | A | 12/2012 |
| JP | 2017-219636 | A | 12/2017 |
| JP | 2018-105927 | A | 7/2018 |
| JP | 2019-144443 | A | 8/2019 |
| JP | 2020-154299 | A | 9/2020 |
| JP | 2020-154300 | A | 9/2020 |
| JP | 2020-154301 | A | 9/2020 |
| JP | 2020-154302 | A | 9/2020 |
| JP | 2021-26199 | A | 2/2021 |
| JP | 2021-26200 | A | 2/2021 |
| JP | 2021-26201 | A | 2/2021 |
| JP | 2021-26202 | A | 2/2021 |
| JP | 2021-67836 | A | 4/2021 |
| WO | 2020/046304 | A1 | 3/2020 |

OTHER PUBLICATIONS

International Search Report issued in corresponding international application No. PCT/JP2023/012457, Jun. 6, 2023.

* cited by examiner

IMAGE FORMING APPARATUS INCLUDING CLUTCH TO SWITCH TRANSMISSION OF DRIVING FORCE

REFERENCE TO RELATED APPLICATIONS

This application is a continuation of International Patent Application No. PCT/JP2023/012457 filed Mar. 28, 2023, which claims priority from Japanese patent Application No. 2022-061737 filed Apr. 1, 2022. The entire contents of both applications is incorporated herein by reference.

BACKGROUND ART

Conventionally, an image forming apparatus including: a process unit; a main housing to which the process unit can be attached; and a toner cartridge which can be attached to the process unit while the process unit is attached to the main housing is known. The process unit has: a developing roller; a developing container accommodating toner; an agitating member for agitating the toner in the housing; and a supply part where the toner cartridge is attached and the toner is supplied from the toner cartridge. The main housing has an opening to expose the supply part of the process unit in a state where the process unit is attached to the main housing. The main housing also has: a cover which can be moved between an open position for opening the opening and a closed position for closing the opening; and conveying rollers for conveying sheets. With the cover of the main housing in the open position, a user can attach the toner cartridge to the supply part of the process unit and supply the process unit with the toner from the toner cartridge. In a state where the cover of the main housing is in the open position, rotation of the conveying rollers is stopped.

SUMMARY

In the conventionally known image forming apparatus, one motor can be used to rotate the conveying rollers and the agitating member.

In this case, when the rotation of the conveying rollers is stopped with the cover of the main housing being in the open position, the rotation of the agitating member is also stopped. However, if the rotation of the agitating member is stopped, the toner supplied from the toner cartridge to the process unit may accumulate near the supply part of the process unit when the user attaches the toner cartridge to the process unit to supply the process unit with the toner.

Therefore, an object of this disclosure is to provide a configuration in which a conveying roller and an agitating member are rotated by a single motor, and in which the agitating member can be rotated while the conveying roller is stopped with the cover of the main housing being in an open position.

To achieve this objective, an image forming apparatus of this disclosure includes: a main housing having a supply section opening, the main housing including: a first conveying roller configured to convey a sheet; and a supply section cover configured to open and close the supply section opening and configured to be movable between a cover opened position at which the supply section cover is opened and a cover closed position at which the supply section cover is closed; a process unit including: a process housing configured to accommodate toner and having a toner receiving port; a developing roller; and an agitating member configured to agitate the toner in the process housing; a toner cartridge configured to be attached to and detached from the process unit through the supply section opening and configured to supply the toner to the process unit, the toner cartridge having at least a part being exposed outside the main housing in a state of the toner cartridge being attached to the process unit; and a controller. The main housing further includes: a first motor configured to drive the first conveying roller and the agitating member; and a clutch configured to be switched between a transmission state where driving force of the first motor is transmitted to the first conveying roller and a non-transmission state where the driving force of the first motor is not transmitted to the first conveying roller. The controller is configured to execute: a first switching process of switching the clutch from the transmission state to the non-transmission state in a case of the supply section cover being positioned in the cover opened position; and a first motor driving process of driving the first motor after the first switching process.

According to the image forming apparatus of this disclosure, in a case where the supply section cover is in the cover opened position, the agitating member can be rotated with the rotation of the first conveying roller being stopped.

According to an aspect of the present disclosure, in a configuration where a single motor drives the agitator member and the conveying roller that conveys sheets, the agitator member can be rotated while the conveying roller is stopped with the cover being in the open position.

BRIEF DESCRIPTION OF DRAWINGS

FIG. 2A depicts a state where a supply section cover is closed, FIG. 2B depicts a state where the supply section cover is opened and before a toner cartridge is attached to the process unit, and FIG. 2C depicts a state where the toner cartridge is attached to the process unit.

FIG. 3A depicts a state where the process unit is attached to the main housing, FIG. 3B depicts a state where the process unit is not attached to the main housing, and FIG. 3C is an enlarged view of main body electrical contacts.

FIG. 5A is a view from an angle from which a first process electrical contact is visible, FIG. 5B is a view from an angle from which a supply section is visible, and FIG. 5C is an enlarged view of an area near the supply section.

FIG. 6A is a perspective view of the supply section, FIG. 6B depicts a state where a process shutter is in a third position, FIG. 6C depicts a state where a toner shutter is in a first position, and FIG. 6D depicts a state where the toner shutter is in a second position.

FIG. 7A is an exploded perspective view of the toner cartridge, and FIG. 7B is a cross-sectional view of the toner cartridge.

FIG. 8A depicts a state before the toner cartridge is attached to the process unit, FIG. 8B depicts a first attached state where the toner cartridge is attached to the process unit, and FIG. 8C is a second attached state where the toner shutter is rotated after the toner cartridge is attached to the process unit.

FIG. 9A depicts the first attached state, and FIG. 9B depicts the second attached state.

DESCRIPTION

The following is a description of an embodiment of this disclosure with reference to the drawings.

1. Overview of a Monochrome Printer 1

In the following description, a direction in which a rotation axis of a developing roller 32 (developing roller axis X1) of a process unit P1 extends is referred to as a "first direction". A direction in which a toner cartridge 200 is attached to and detached from the process unit P1 with the process unit P1 attached to the monochrome printer 1 is referred to as a "second direction". A direction orthogonal to the first and second directions is referred to as a "third direction".

Figure 1:
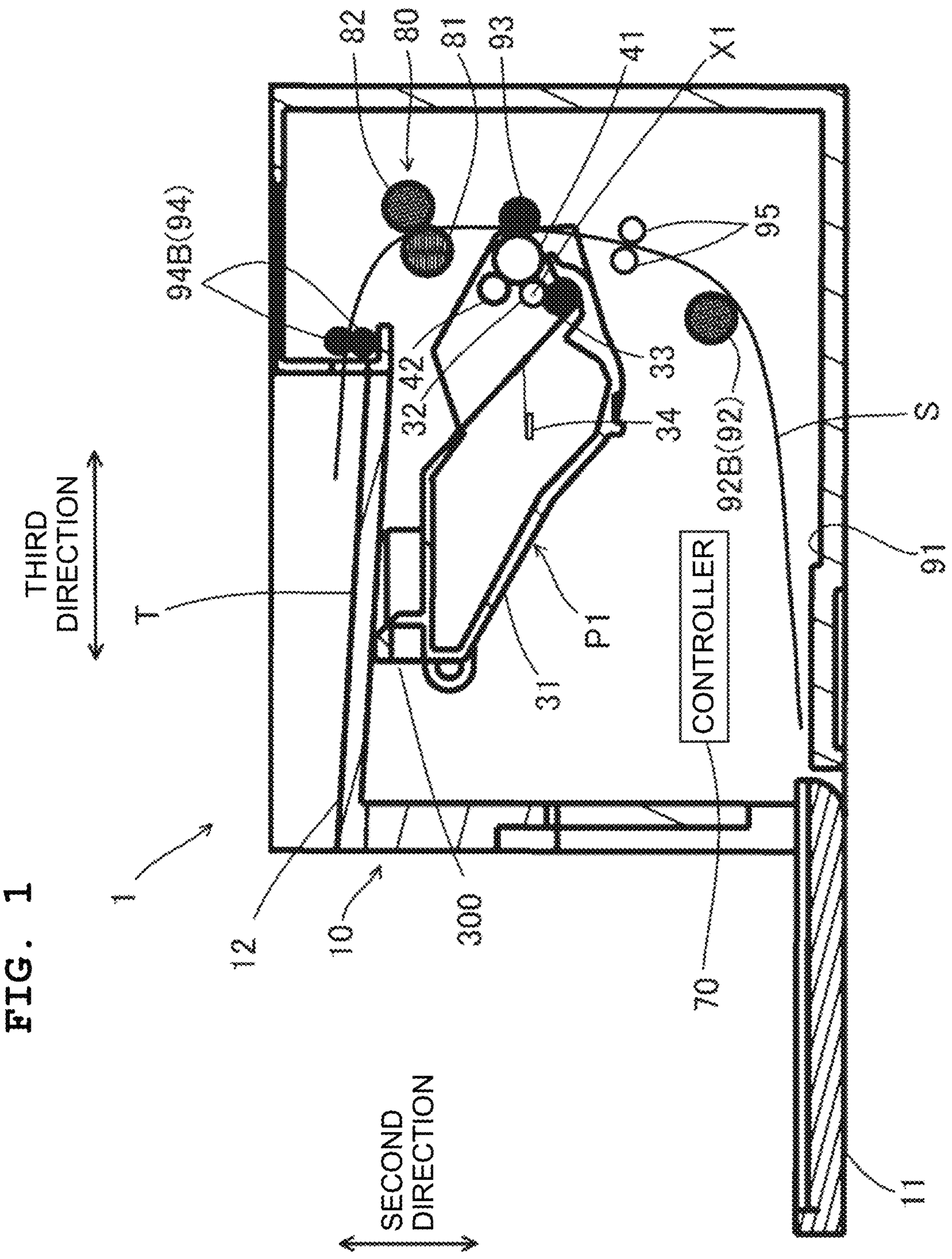
FIG. 1 is a cross-sectional view of a monochrome printer as an example of an image forming apparatus.

As depicted in FIGS. 1 and 2, the monochrome printer 1 as an example of an image forming apparatus includes a main housing 10, a controller 70, the process unit P1, a toner cartridge 200, a fixing section 80, and a sheet conveying unit including a sheet accommodating section 91, a feeding roller 92, a transfer roller 93, a discharge roller 94, a registration roller 95, and a discharge tray T.

The controller 70 has, for example, a CPU, a RAM, a ROM, and an input/output circuit. The controller 70 controls the monochrome printer 1 by, for example, performing an arithmetic process based on a program or the like stored in the ROM. The controller 70 controls the monochrome printer 1 based on information stored in a toner memory 260 of the attached toner cartridge 200, for example.

As depicted in FIG. 1, the process unit P1 includes a process housing 31, a developing roller 32, a supply roller 33, an agitator 34, a photosensitive drum 41, and a charging roller 42.

The process housing 31 can accommodate toner.

The developing roller 32 is rotatable about the developing roller axis X1 extending in the first direction. The developing roller 32 supplies the toner in the process housing 31 to a surface of the photosensitive drum 41. The developing roller 32 is located at one end of the process housing 31 in the third direction in a state where the process unit P1 is attached to the main housing 10.

The supply roller 33 is rotatable about a supply roller axis extending in the first direction. The supply roller 33 supplies the toner in the process housing 31 to a surface of the developing roller 32.

The agitator 34 is rotatable about an agitator axis extending in the first direction. The agitator 34 agitates the toner in the process housing 31. The agitator 34 is an example of an agitating member.

The photosensitive drum 41 is rotatable about a drum axis extending in the first direction. The photosensitive drum 41 carries a toner image created by receiving a supply of the toner from the developing roller 32 to an electrostatic latent image created by an exposure unit. The photosensitive drum 41 can transfer the carried toner image to the sheet S by sandwiching the sheet S between the photosensitive drum 41 and a transfer roller 93.

The charging roller 42 is rotatable about a charging roller axis extending in the first direction. The charging roller 42 electrically charges the surface of the photosensitive drum 41 by contacting the drum 41 with a voltage being applied to the charging roller 42.

As depicted in FIG. 2, the toner cartridge 200 can be attached to the process unit P1, in a state where the process unit P1 is attached to the main housing 10. The toner cartridge 200 can supply the process unit P1 with the toner.

Returning to FIG. 1, the fixing section 80 includes a heating roller 81 and a pressure roller 82. The fixing section 80 fixes the toner to the sheet S by sandwiching the sheet S, onto which the toner has been transferred, between the heating roller 81 and the pressure roller 82.

The sheet conveying unit includes the sheet accommodating section 91, the feeding roller 92, the transfer roller 93, the discharge roller 94, the registration roller 95, and the discharge tray T.

The sheet accommodating section 91 accommodates sheets S.

The feeding roller 92 conveys the sheet S from the sheet accommodating section 91 to the photosensitive drum 41. The feeding roller 92 includes a roller body 92B and a feeding roller gear 92A, which is located at one end of the roller body 92B in the first direction and rotates with the roller body 92B (see FIG. 4). In this embodiment, the feeding roller 92 is an example of a first conveying roller. In other words, the first conveying roller includes the feeding roller 92.

The transfer roller 93 conveys the sheet S to the fixing section 80 while nipping the sheet S between the transfer roller 93 and the photosensitive drum 41.

The discharge roller 94 discharges the sheet S that has passed through the fixing section 80 out of the main housing 10. The discharged sheet S is loaded up on the discharge tray T. The discharge roller 94 includes a roller body 94B and a discharge roller gear 94A, which is located at one end of the roller body 94B in the first direction and rotates with the roller body 94B (see FIG. 4). In this embodiment, the discharge roller 94 is an example of a second conveying roller. In other words, the second conveying roller includes the discharge roller 94.

The registration roller 95 conveys the sheet S conveyed from the feeding roller 92 toward the photosensitive drum 41.

2. Main Housing 10

As depicted in FIGS. 2A to 3B, the main housing 10 includes a front cover 11, a top cover 12, a supply section cover 13, main body electrical contacts 14, a second detecting section 15, and a panel 16. The main housing 10 has a housing opening 10A and a supply section opening 10B.

Figure 3B:
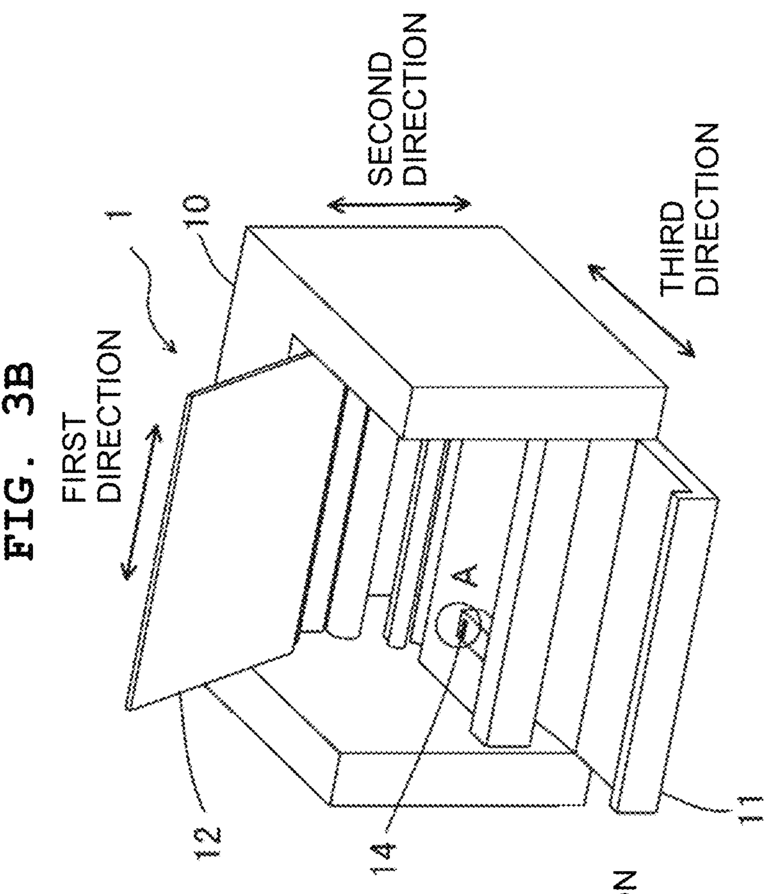
FIGS. 3A, 3B and 3C are perspective views of the monochrome printer with a front cover and a top cover opened.
Figure 3C:
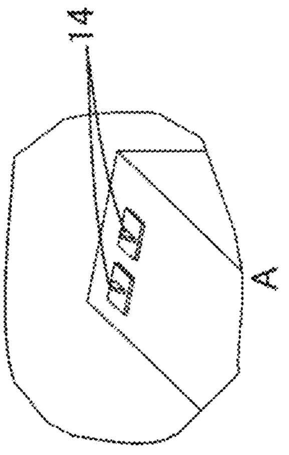
Figure 3A:
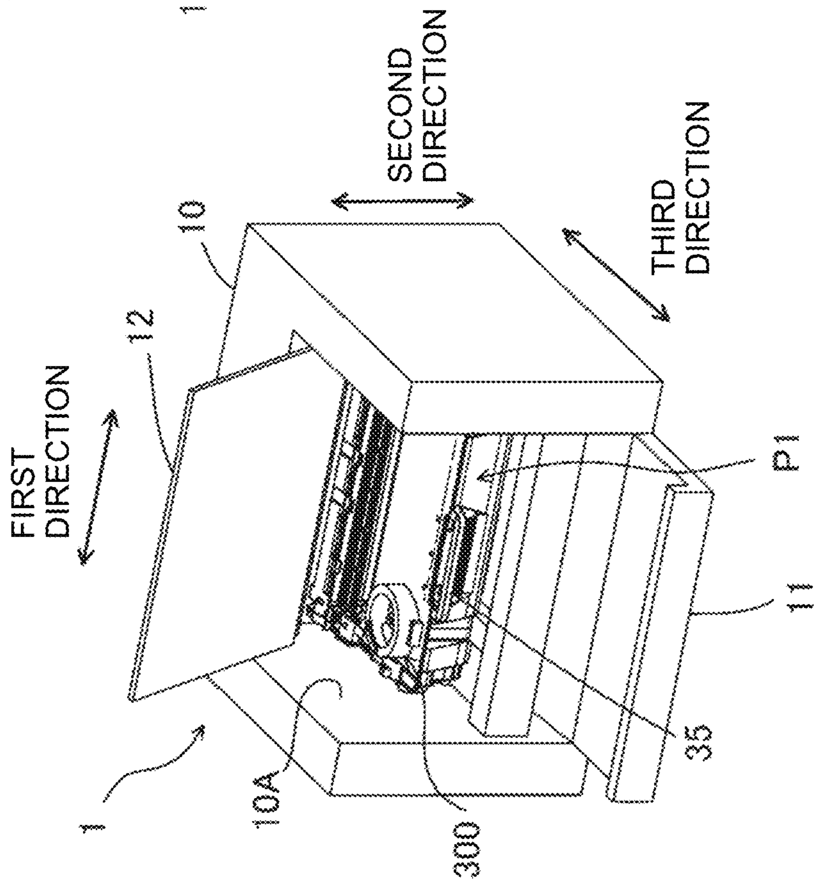

As depicted in FIGS. 3A and 3B, the front cover 11 can open and close a portion of the housing opening 10A. A user can accommodate the sheets S in the sheet accommodating section 91 with the front cover 11 open.

The top cover 12 can open and close a portion of the housing opening 10A of the main housing 10. The top cover 12 becomes a part of the discharge tray T when the top cover 12 closes the part of the housing opening 10A. With the top cover 12 open, the user attaches and detaches the process unit P1 to and from the main housing 10 through the housing opening 10A. Thus, the process unit P1 can be attached to and detached from the main housing 10 with the top cover 12 open.

The supply section cover 13 is located at one end of the main housing 10 in the second direction. The supply section cover 13 opens and closes the supply section opening 10B.

Figure 2A:
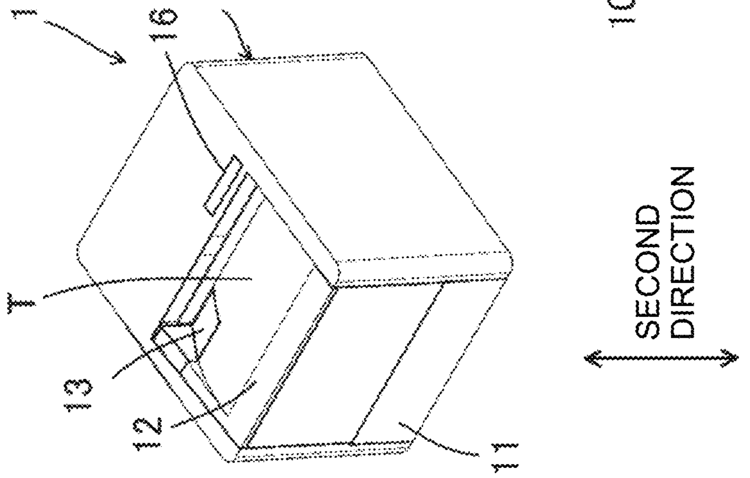
FIGS. 2A, 2B and 2C are perspective views of the monochrome printer with a process unit attached to a main housing.
Figure 2B:
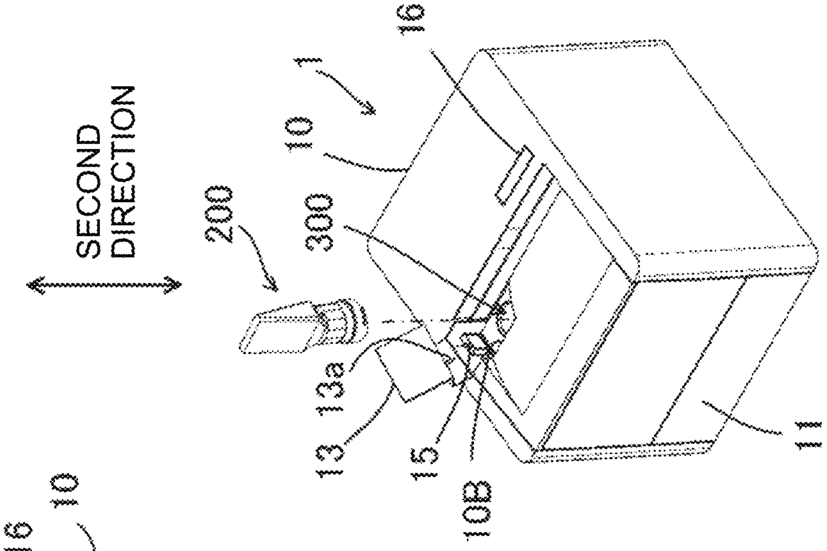
Figure 2C:
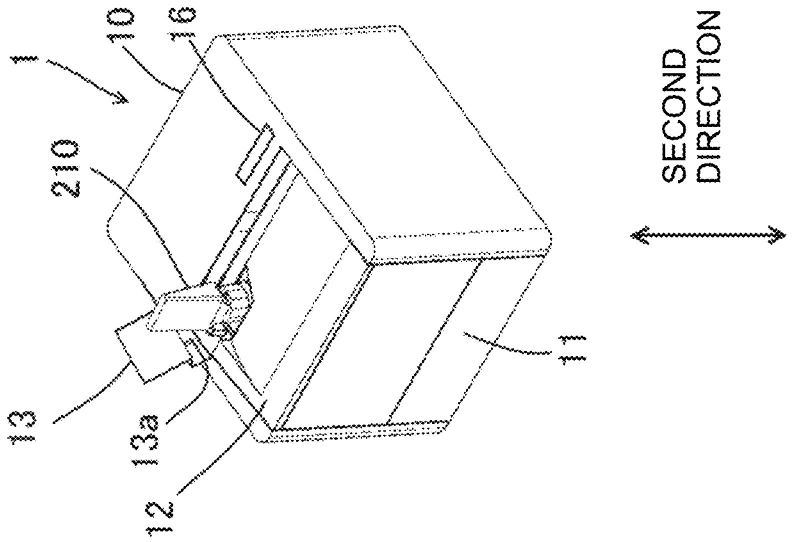

The supply section cover 13 can move between a cover opened position where the supply section cover 13 opens the supply section opening 10B as depicted in FIGS. 2B and 2C, and a cover closed position where the supply section cover 13 closes the supply section opening 10B as depicted in FIG. 2A. As depicted in FIG. 2A, the supply section cover 13 becomes a part of the discharge tray T when the supply section cover 13 is in the cover closed position. As depicted in FIG. 2B, the supply section cover 13 causes a supply section 300 described later of the process unit P1 with the supply section cover 13 in the cover opened position. As depicted in FIGS. 2B and 2C, the toner cartridge 200 can be attached to and detached from the process unit P1 via the supply section opening 10B in the second direction when the process unit P1 is attached to the main housing 10. Thus, the toner cartridge 200 can be attached to the process unit P1 when the supply section cover 13 is in the cover closed position. The supply section cover 13 has a protrusion 13*a*. The protrusion 13*a* is detected by the second detecting section 15 when the supply section cover 13 is in the cover closed position.

The second detecting section 15 detects the opening and closing of the supply section cover 13. As depicted in FIG. 2B, the second detecting section 15 is located below the supply section cover 13. The second detecting section 15 is an optical sensor in this embodiment. Specifically, the optical sensor is not blocked by the supply section cover 13 when the supply section cover 13 is in the cover opened position, and is blocked by the protrusion 13*a* of the supply section cover 13 when the supply section cover 13 is in the cover closed position. This allows the controller 70 to determine whether the supply section cover 13 is open or closed, because the detection signal by the optical sensor is changed when the supply section cover is positioned in the cover opened position or in the cover closed position.

The panel 16 is located on an outer surface of the main housing 10. The panel 16 can display error notifications and other information.

As depicted in FIGS. 3B, the main body electrical contacts 14 are located below the process unit P1 when the process unit P1 is attached to the main housing 10. The main body electrical contacts 14 contact a first process electrical contact 331 described later when the process unit P1 is attached to the main housing 10. The main body electrical contacts 14 are electrically connected to the controller 70. The main body electrical contacts 14 are an example of a first detecting section.

Figure 4:
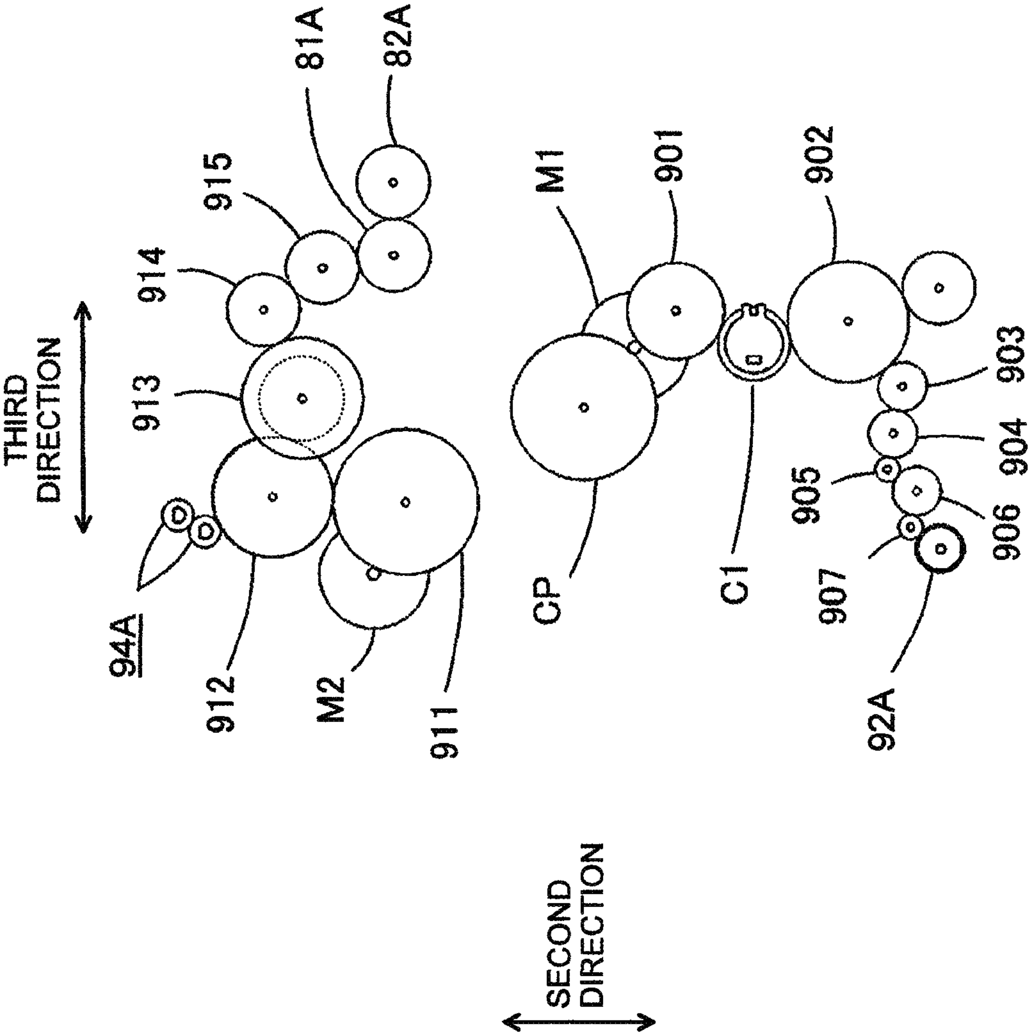
FIG. 4 is a view of a drive row of the main housing as viewed from a first direction.

As depicted in FIG. 4, the main housing 10 further includes a first motor M1, a second motor M2, an electromagnetic clutch C1, a main coupling CP, first idle gears 901, 902, 903, 904, 905, 906, 907, and second idle gears 911, 912, 913, 914, 915.

The first motor M1 engages with the main coupling CP and the first idle gear 901.

The second motor M2 engages with the second idle gear 911.

The electromagnetic clutch C1 is switchable between a transmission state in which driving force from the first idle gear 901 is transmitted to the first idle gear 902 and a non-transmission state in which the driving force from the first idle gear 901 is not transmitted to the first idle gear 902. The electromagnetic clutch C1 is an example of a clutch.

The main coupling CP can transmit driving force from the second motor M2 to a process coupling 36 when the process unit P1 is attached to the main housing 10.

The first idle gears 901, 902, 903, 904, 905, 906, 907 are gears for transmitting driving force from the first motor M1.

The first motor M1 drives the main coupling CP. Thereby, the first motor M1 drives the process coupling 36. The first motor M1 also drives the feeding roller gear 92A via the electromagnetic clutch C1 and the first idle gears 901, 902, 903, 904, 905, 906, and 907, when the electromagnetic clutch C1 is in the transmission state. As a result, the first motor M1 drives the feeding roller 92.

The second idle gears 911, 912, 913, 914, and 915 are gears for transmitting the driving force from the second motor M2.

The second motor M2 drives the discharge roller gear 94A via the second idle gears 911 and 912. As a result, the second motor M2 drives the discharge roller 94. The second motor M2 also drives a fixing roller gear 81A and a pressure roller gear 82A via the second idle gears 911, 912, 913, 914, and 915. In this way, the second motor M2 drives the fixing section 80.

3. Process Unit P1

Figure 5B:
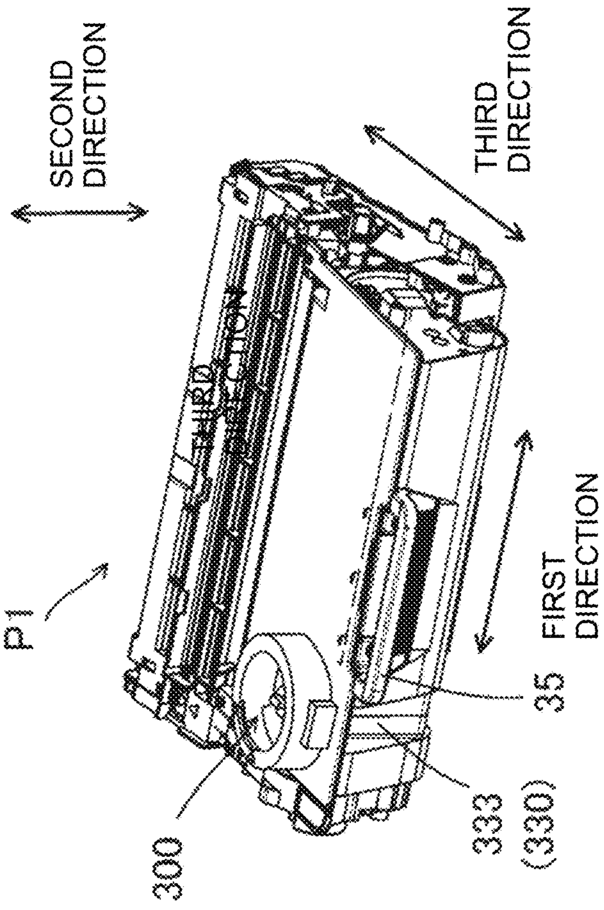
FIGS. 5A, 5B and 5C are perspective views of the process unit.
Figure 5C:
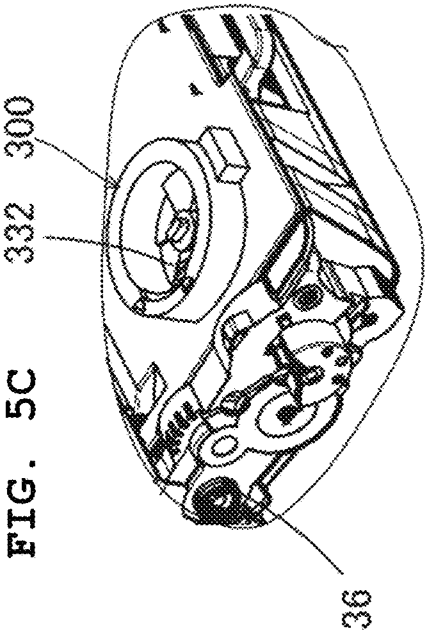
Figure 5A:
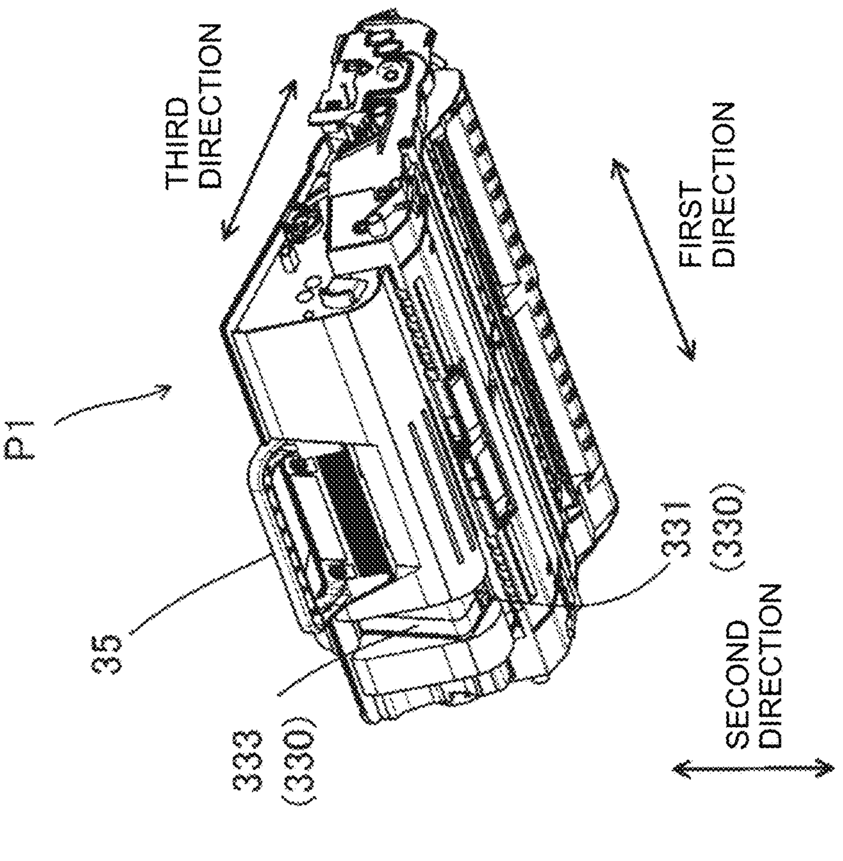

As depicted in FIGS. 5A to 5C, the process unit P1 further includes a cartridge handle 35, the process coupling 36, a process electrical relay section 330, and the supply section 300.

The cartridge handle 35 is located at the other end of the process housing 31 in the third direction. When the user attaches or detaches the process unit P1 to or from the main housing 10, the user grasps the cartridge handle 35 to perform the attachment or detachment operation.

The process coupling 36 is located at one end of the process housing 31 in the first direction. The process coupling 36 receives driving force from the main housing 10. The process coupling 36 transmits the driving force received from the main housing 10 to the developing roller 32, the supply roller 33, and the agitator 34.

The process electrical relay section 330 can electrically connect a toner memory 260 of the toner cartridge 200 and the main body electrical contacts 14 of the main housing 10 when the toner cartridge 200 is attached to the supply section 300. The process electrical relay section 330 includes a first process electrical contact 331, a second process electrical contact 332, and a harness 333. As depicted in FIG. 5A, the first process electrical contact 331 is located on an opposite side to the supply section 300 in the second direction. The first process electrical contact 331 contacts the main body electrical contacts 14 when the process unit P1 is attached to the main housing 10. As a result, the first process electrical contact 331 is electrically connected to the controller 70 via the main body electrical contacts 14. The second process electrical contact 332 is located in the supply section 300. The second process electrical contact 332 contacts a toner electrical contact 261 described later when the toner cartridge 200 is attached to the process unit P1. The harness 333 electrically connects the first process electrical contact 331 and the second process electrical contact 332. Thereby, the second process electrical contact 332 is electrically connected to the first process electrical contact 331.

Figure 6A:
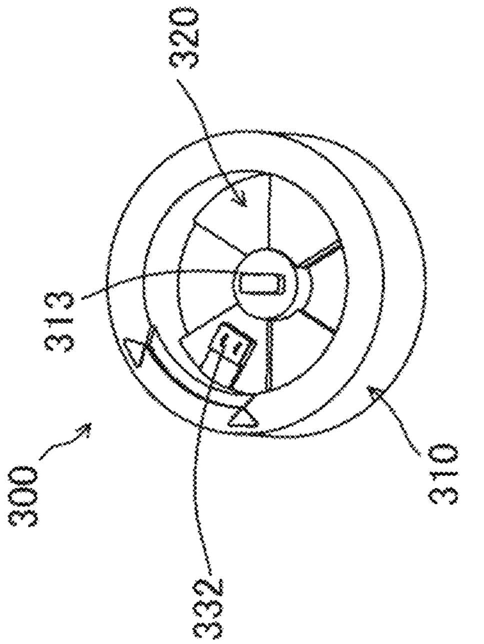
FIGS. 6A, 6B, 6C and 6D depict the supply section and toner cartridge.

The supply section 300 is a section to which the toner cartridge 200 is attached. As depicted in FIG. 5B, the supply section 300 is located at one end of the process housing 31 in the second direction. With the toner cartridge 200 attached to the supply section 300, the toner can be supplied to the process housing 31 via a toner receiving port 300A. As depicted in FIG. 6A, the supply section 300 includes a body 310, a protrusion 313, and a process shutter 320. The supply section 300 has the toner receiving port 300A.

The body 310, when the toner cartridge 200 is attached to the process unit P1, covers a part of an outer surface of the toner shutter 240 described later.

The protrusion 313 protrudes in the second direction. The protrusion 313 is inserted into a groove 224, of the toner cartridge 200, described later, when the toner cartridge 200 is attached to the process unit P1.

Figure 6B:
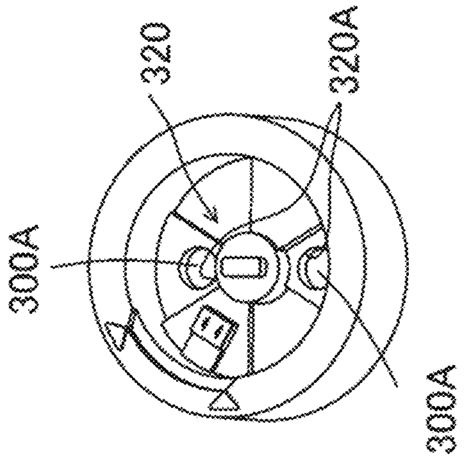

The process shutter 320 is rotatable with respect to the body 310. The process shutter 320 has a shutter opening 320A. The process shutter 320 is located inside the main body 310. The process shutter 320 can rotate between a third position, as depicted in FIG. 6A, at which the process shutter 320 closes the toner receiving ports 300A, and a fourth position, as depicted in FIG. 6B, at which the process shutter 320 opens the toner receiving ports 300A. When the process shutter 320 is at the fourth position, the shutter opening 320A is communicated with the toner receiving ports 300A. As a result, the process shutter 320 opens and closes the toner receiving ports 300A.

4. Toner Cartridge 200

As depicted in FIGS. 6A to 7B, the toner cartridge 200 has a toner housing 201, a handle 230, a toner shutter 240, a seal 250, and a toner memory 260.

The toner housing 201 can accommodate the toner. The toner housing 201 has a toner outlet 223A. More specifically, the toner housing 201 has a toner container 210 for accommodating the toner and a nozzle 220 having the toner outlet 223A.

The toner container 210 has a toner container opening 210A through which the toner accommodated inside can be discharged. The toner container 210 is made of resin such as ABS or BS. A portion of the toner container 210 is exposed outside the main housing 10 when the toner cartridge 200 is attached to the process unit P1.

The nozzle 220 has a toner discharge port 223A. The nozzle 220 can discharge the toner in the toner container 210 to the outside of the toner cartridge 200 through the toner discharge port 223A. The nozzle 220 has the groove 224 that is recessed in the second direction, toward the toner container 210. The groove 224 overlaps with a toner shutter axis Y1.

The handle 230 is a cylindrical component. The handle 230 covers the outer surface of the nozzle 220. The handle 230 is located between the toner container 210 and the toner shutter 240 in the second direction.

Figure 6C:
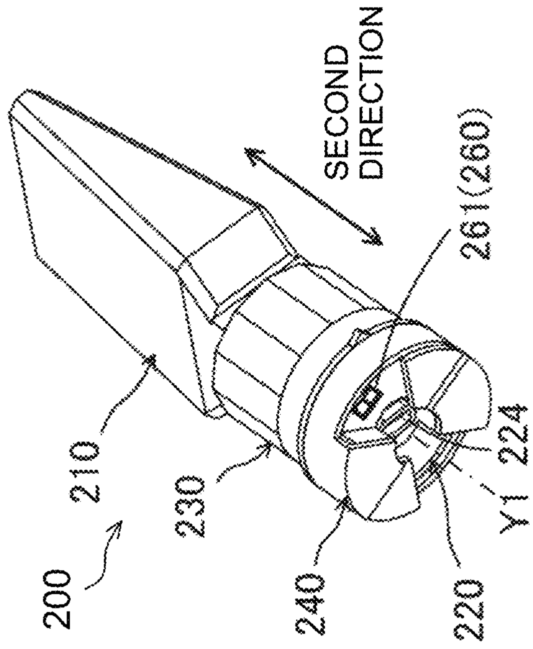
Figure 6D:
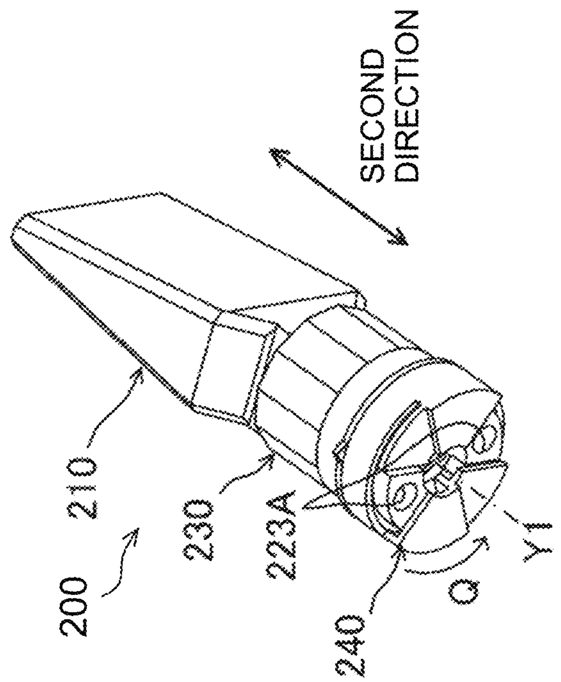

The toner shutter 240 is located on an opposite side to the toner container 210 with respect to the nozzle 220 in the second direction. The toner shutter 240 can be rotated between a first position to close the toner outlet 223A as depicted in FIG. 6C, and a second position to open the toner outlet 223A as depicted in FIG. 6D. The toner shutter 240 is rotatable about the toner shutter axis Y1 extending in the second direction with the toner cartridge 200 attached to the process unit P1.

Figure 7A:
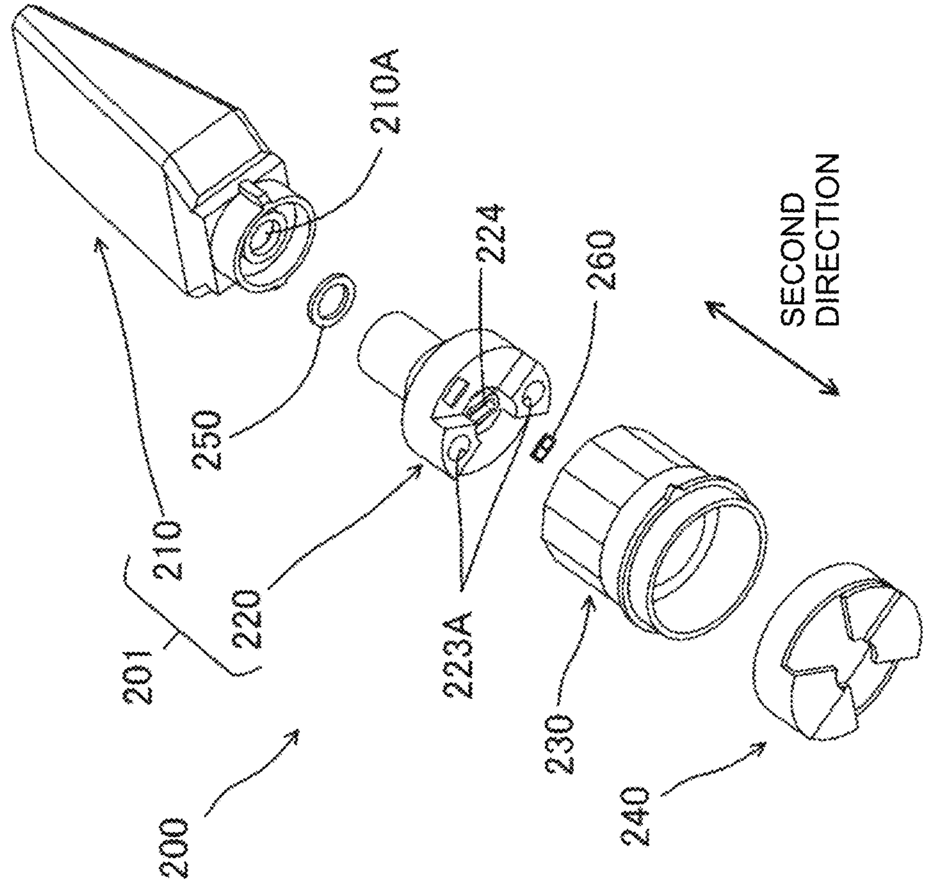
FIGS. 7A and 7B depict the toner cartridge.
Figure 7B:
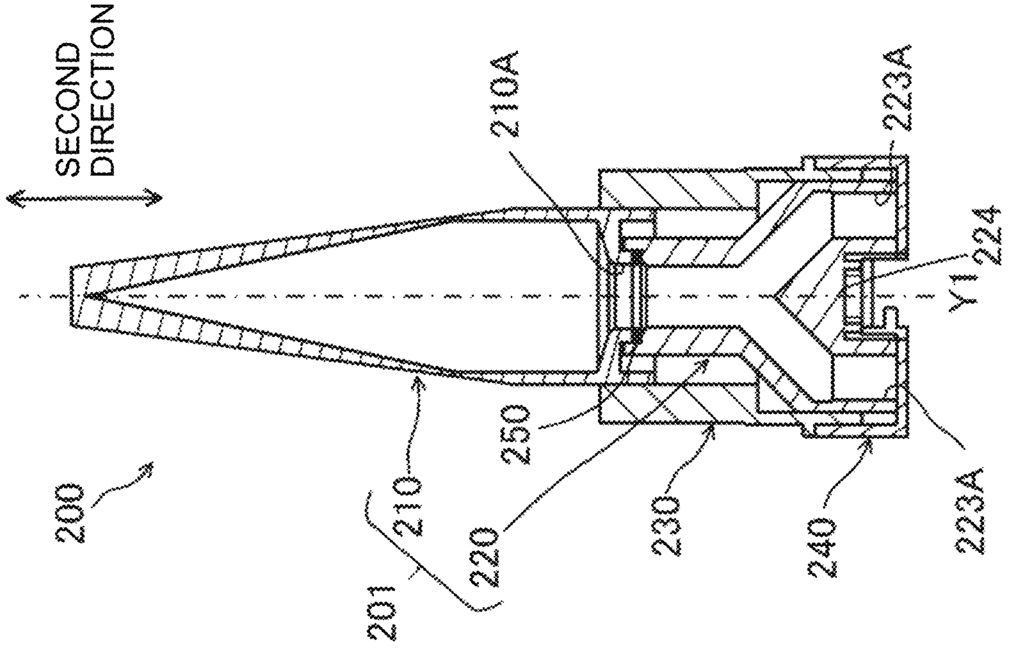

As depicted in FIGS. 7A and 7B, the seal 250 is sandwiched between the toner container 210 and the nozzle 220. The seal 250 prevents the toner from leaking out of the toner cartridge 200 from a gap between the toner container 210 and the nozzle 220 as the toner travels from the toner container opening 210A to a communicating port 221A.

The toner memory 260 is a storage medium for storing information about the toner cartridge 200. The toner memory 260 stores an amount of the toner accommodated in the toner cartridge 200. The toner memory 260 may also store, as an example, a serial number, the year and month of manufacture of the toner cartridge, information about a color of the toner accommodated in the toner cartridge 200, and information about a country of sale of the toner cartridge 200. Toner memory 260 is located on the nozzle 220. The toner memory 260 has a toner electrical contact 261. The toner electrical contact 261 is located on the nozzle 220. The toner electrical contact 261 faces in the second direction.

5. Operation of Attaching the Toner Cartridge 200 to the Supply Section 300

Figure 8B:
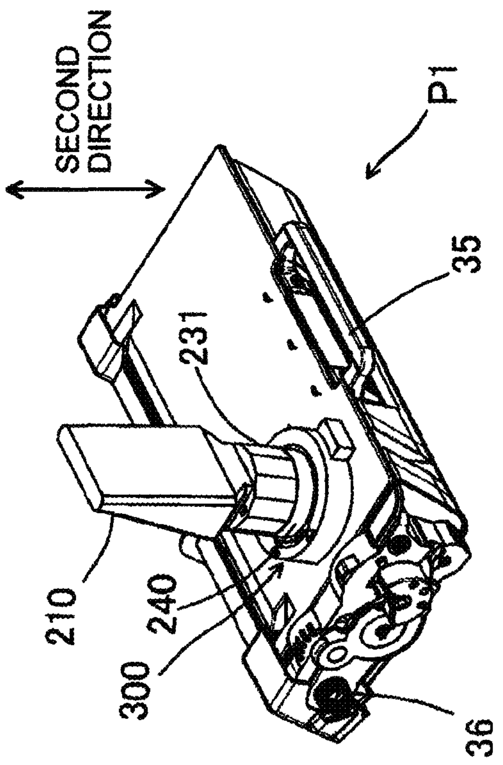
FIGS. 8A, 8B and 8C depict a process of attaching the toner cartridge to the process unit.
Figure 8C:
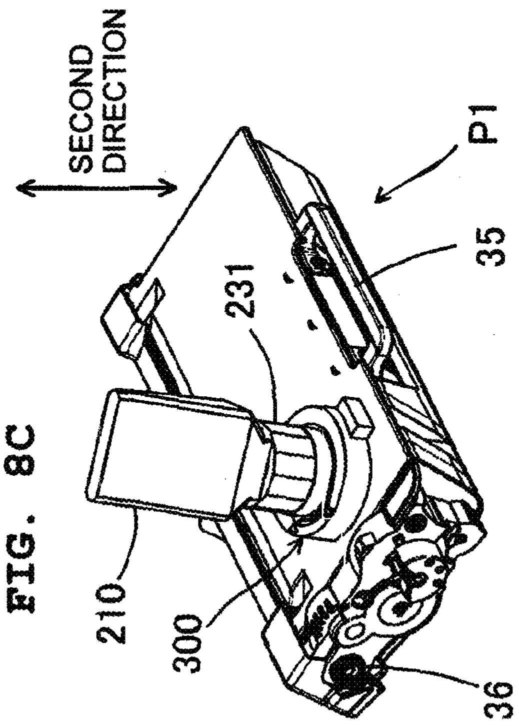
Figure 8A:
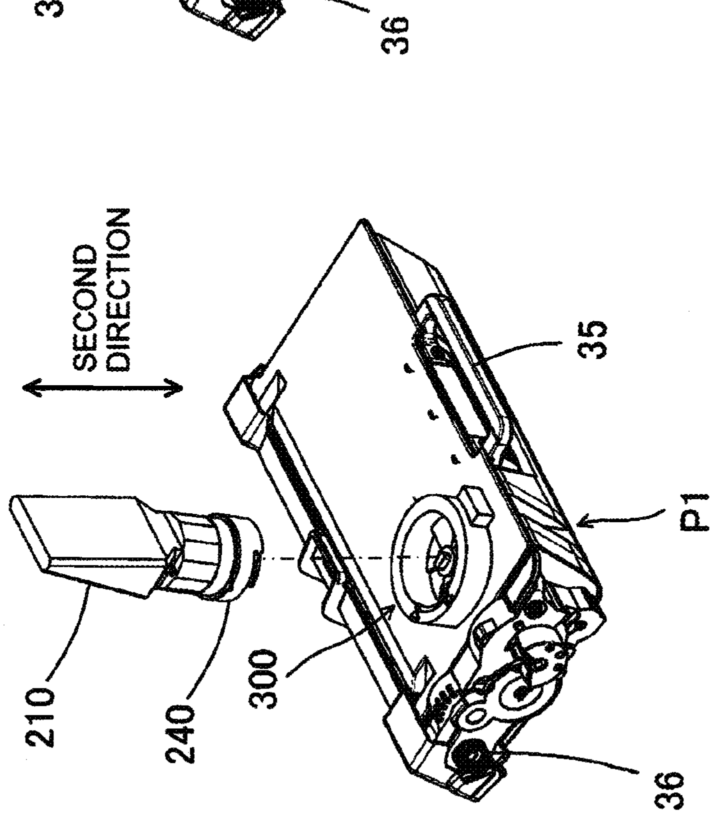
Figure 9B:
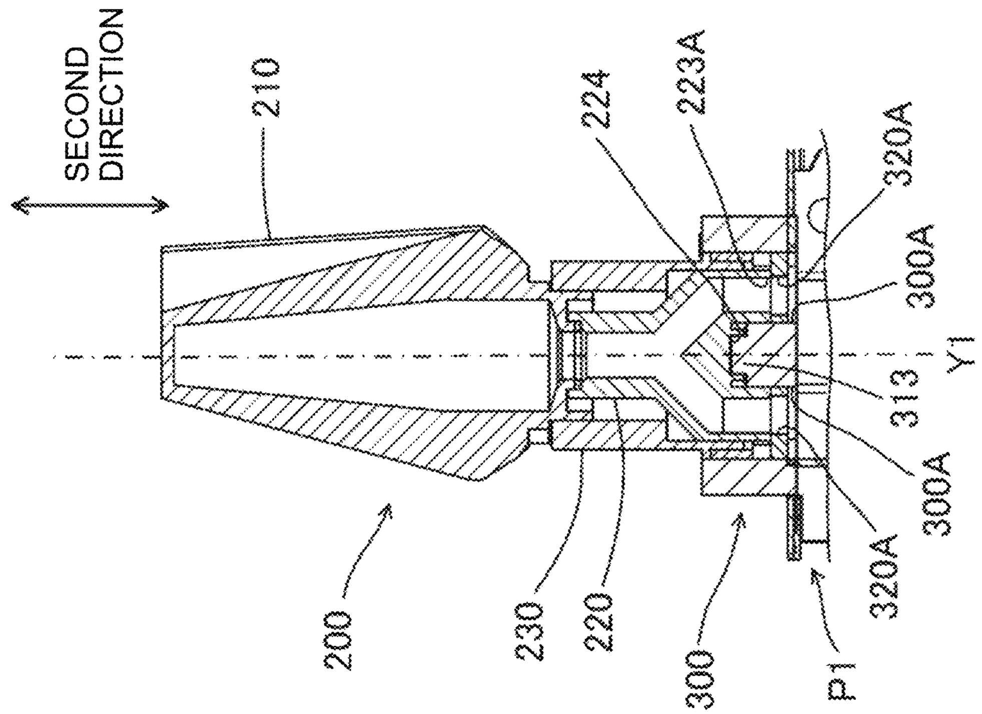
FIGS. 9A and 9B are cross-sectional views of a state where the toner cartridge is attached to the process unit.

An operation of attaching the toner cartridge 200 to the supply section 300 is described using FIGS. 8A to 9B. In the following description, a state depicted in FIG. 8B is referred to as a first attached state. FIG. 9A also depicts the first attached state. A state depicted in FIG. 8C is referred to as a second attached state. FIG. 9B also depicts the second attached state.

In FIG. 8A, before the toner cartridge 200 is attached to the supply section 300, the toner shutter 240 is in the first position (see FIG. 6C) and the process shutter 320 is in the third position (see FIG. 6A).

As depicted in FIGS. 8A and 8B, the user attaches the toner shutter 240 of the toner cartridge 200 to the supply section 300. When the toner cartridge 200 is attached to the supply section 300 as depicted in FIG. 8B, the toner electrical contact 261 contacts the second process electrical contact 332. As a result, the controller 70 is electrically connected to the toner memory 260 via the second process electrical contact 332, the first process electrical contact 331, and the body electrical contacts 14. In this embodiment, the controller 70 can detect that the toner cartridge 200 is attached to the process unit P1 when the controller 70 can communicate with the toner memory 260.

Figure 9A:
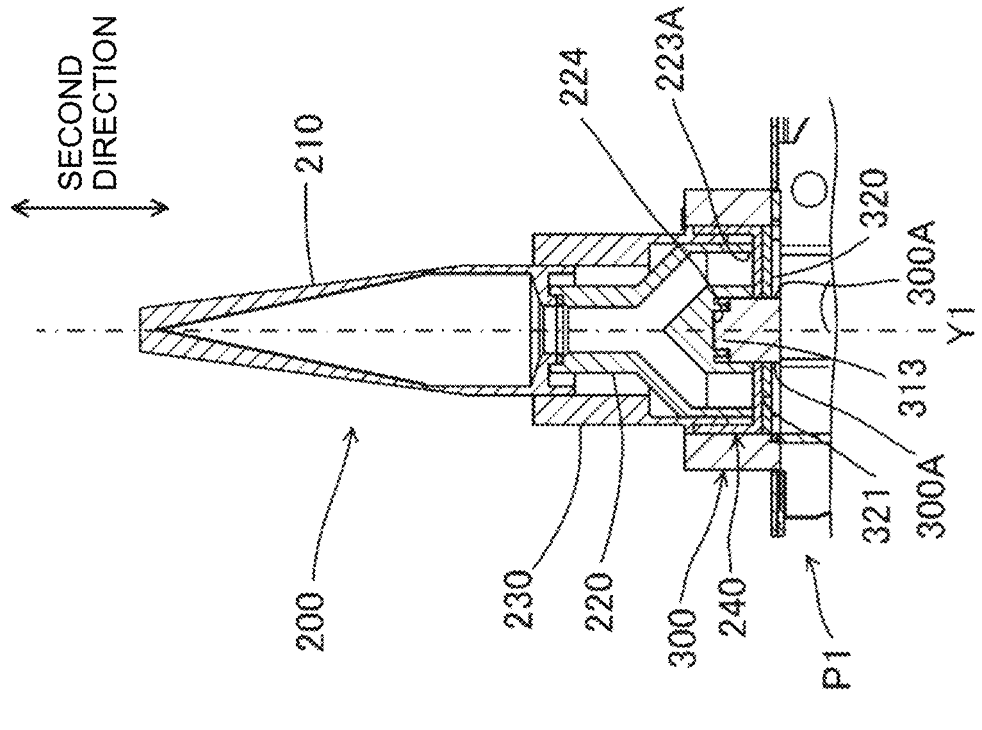

As depicted in FIG. 9A, in the first attached state, the protrusion 313 is inserted into the groove 224. The nozzle 220 is prevented from rotating with respect to the supply section 300 by the protrusion 313 inserted into the groove 224. As a result, the toner shutter 240 can rotate between the first and second positions with respect to the nozzle 220 with the protrusion 313 inserted into the groove 224.

In the first attached state, the toner shutter 240 closes the toner outlet 223A. The process shutter 320 also closes the toner receiving port 300A. In other words, in the first attached state, the toner shutter 240 is in the first position and the process shutter 320 is in the third position. As a result, the toner is not supplied in the first attached state.

The user then rotates the toner cartridge 200 with respect to the process unit P1, as depicted in FIGS. 8B and 8C. As the toner cartridge 200 is rotated, the toner shutter 240 presses the process shutter 320 in a direction of rotation of the toner shutter 240. As a result, the toner cartridge 200 goes from the first attached state depicted in FIG. 9A to the second attached state depicted in FIG. 9B.

As depicted in FIG. 9B, in the second attached state, the toner shutter 240 opens the toner outlet 223A. The process shutter 320 also opens the toner receiving port 300A. In other words, in the second attached state, the toner shutter 240 is in the second position and the process shutter 320 is in the fourth position. As a result, the toner outlet 223A is communicated with the toner receiving port 300A via the shutter opening 320A. In the second attached state, the user can supply the process unit P1 with the toner from the toner cartridge 200.

6. Controller 70

Figure 10:
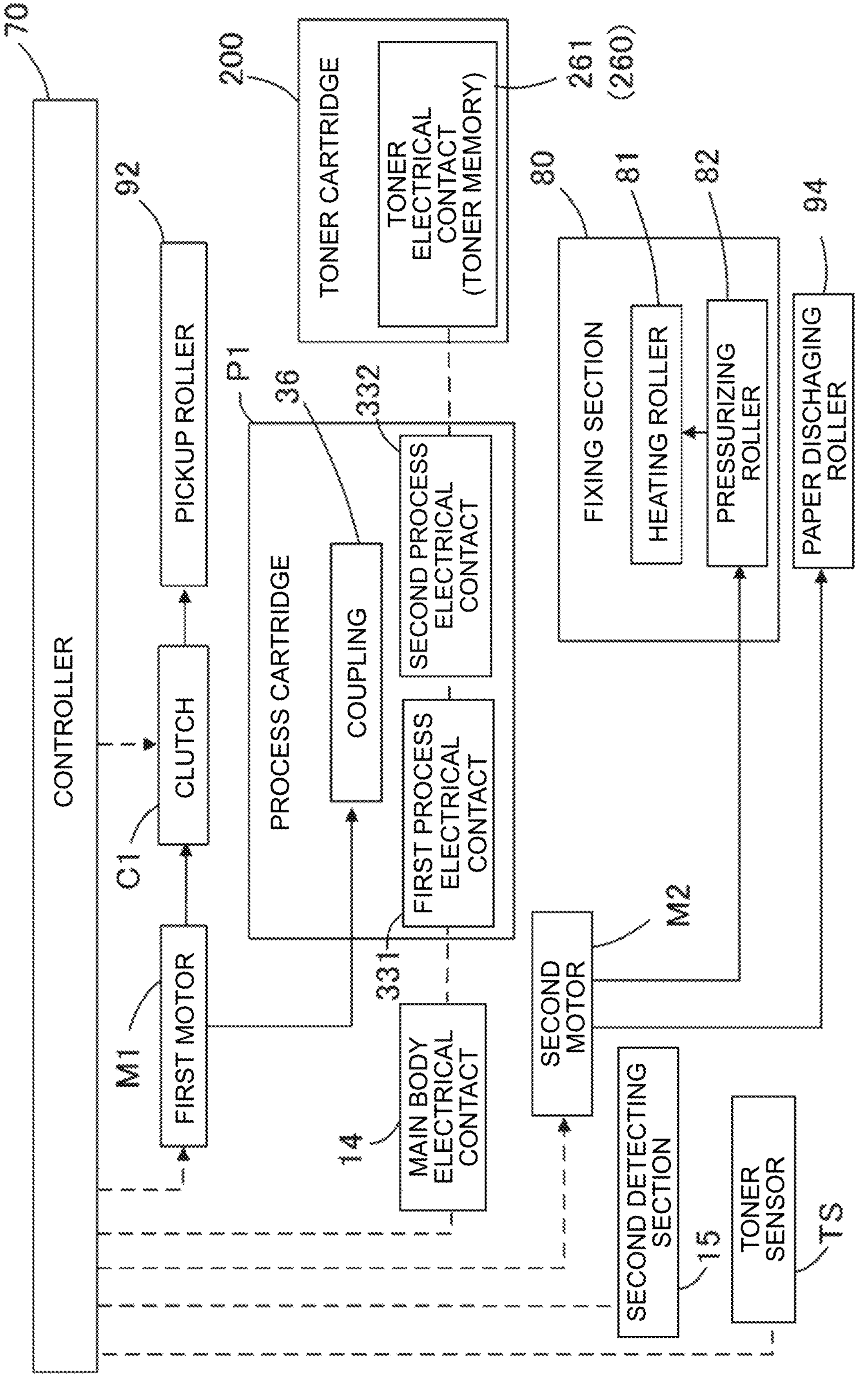
FIG. 10 is a block diagram depicting a relationship between a controller and various components.

FIG. 10 is a block diagram indicating a relationship between the controller 70 and various components. In FIG. 10, the first idle gears 901, 902, 903, 904, 905, and the second idle gears 911, 912, 913, 914, 915 are omitted.

The controller 70 can detect that the toner cartridge 200 has been attached to the process unit P1 by using the main body electrical contacts 14. Specifically, the controller 70 detects that the toner cartridge 200 is attached to the process unit P1 when the controller 70 is electrically connected to the toner memory 260 via the main body electrical contacts 14, the first process electrical contact 331, the second process electrical contact 332, and the toner electrical contact 261. The controller 70 can read information from and write information to the toner memory 260 via the main body electrical contacts 14, the first process electrical contact 331, the second process electrical contact 332, and the toner electrical contact 261.

The controller 70 can detect the opening and closing of the supply section cover 13 by the detection signal of the second detecting section 15. Specifically, the controller 70 can detect whether the supply section cover 13 is in the cover opened position or the cover closed position.

The controller 70 can detect the amount of the toner remaining in the process housing 31 by means of a toner sensor TS.

The controller 70 can execute a first motor driving process to drive the first motor M1.

The controller 70 can execute a second motor driving process to drive the second motor M2.

The controller 70 can execute a first switching process to switch the electromagnetic clutch C1 from the transmission state to the non-transmission state and a second switching process to switch the electromagnetic clutch C1 from the non-transmission state to the transmission state. Specifically, the controller 70 puts the electromagnetic clutch C1 into the transmission state by applying current to the electromagnetic clutch C1 and puts the electromagnetic clutch C1 into the non-transmission state by not applying the current to the electromagnetic clutch C1.

7. Control of a Case where the Supply Section Cover is Opened

Figure 11:
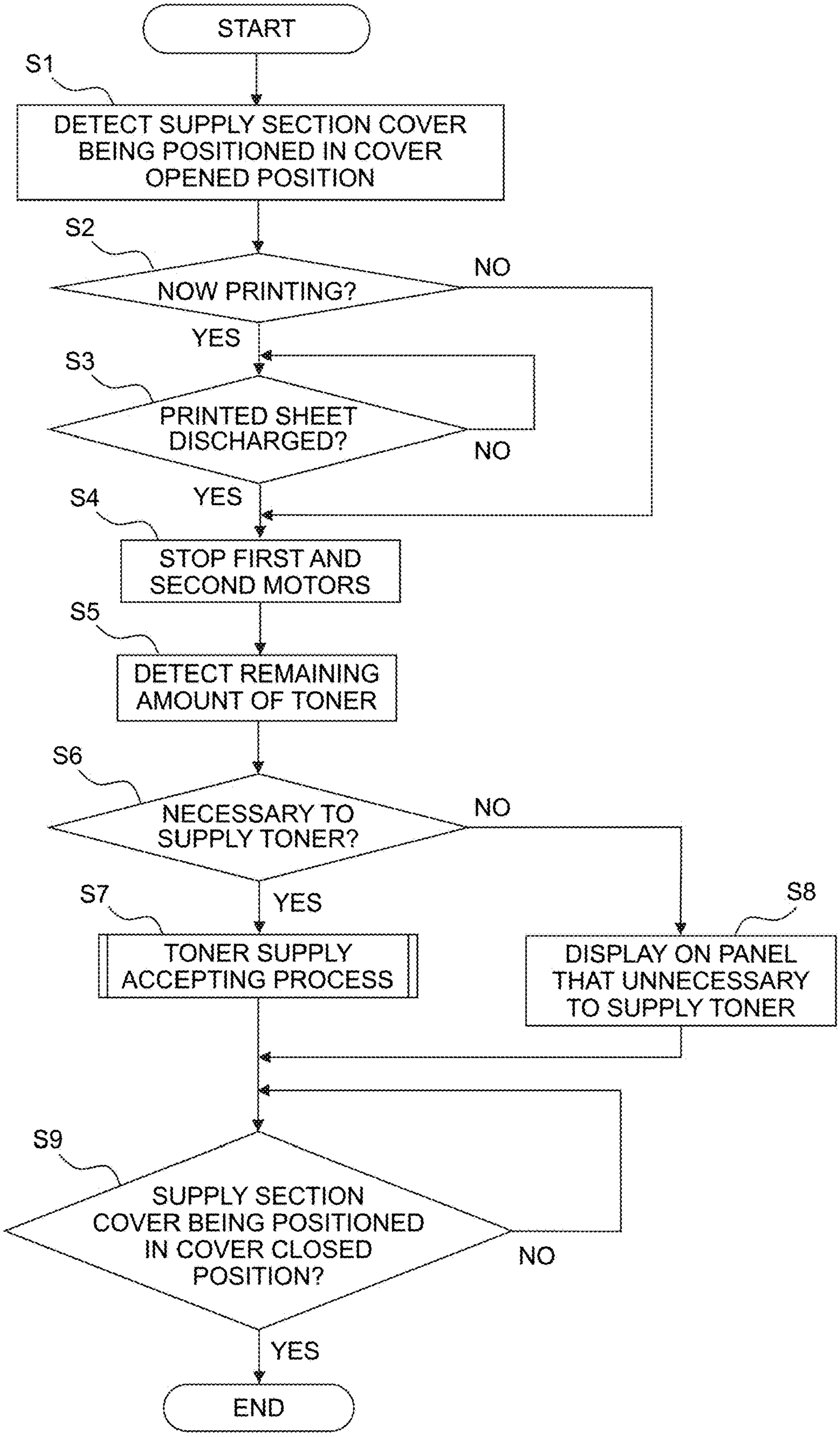
FIG. 11 is a flow chart depicting processes when the supply section cover is opened.

FIG. 11 is a flowchart indicating control of a case where the supply section cover 13 is opened.

When the controller 70 detects that the supply section cover 13 is positioned in the cover opened position by the second detecting section 15 (step S1), the controller determines whether printing is in progress (step S2).

If the controller 70 determines that the printing is in progress in step S2 (step S2: YES), the controller 70 determines whether the sheet being printed has been discharged (step S3). If the controller 70 determines that the sheet being printed has not been discharged (step S3: NO), the controller 70 repeats the process of step S3 until the sheet being printed has been discharged. On the other hand, if the controller 70 determines that the sheet being printed has been discharged (step S3: YES), the controller 70 executes a stop process of stopping the first motor M1 and the second motor M2 (step S4).

On the other hand, if the controller 70 determines in step S2 that the printing is not in progress (step S2: NO), the controller 70 performs the stop process (step S4). If the first motor M1 and the second motor M2 are stopped from the beginning, nothing is done.

The controller 70 then detects the amount of toner remaining in the process housing 31 by the toner sensor TS (step S5). Then, the controller 70 determines whether supply of the toner is necessary based on the remaining amount in the process housing 31 (step S6). Specifically, the controller 70 determines that the supply of the toner is necessary (step S6: YES) if the remaining amount of the toner detected in step S2 is less than a threshold value, and determines that the supply of the toner is unnecessary (step S6: NO) if the remaining amount of the toner detected in step S2 is not less than the threshold value. The threshold value is defined, for example, by subtracting the amount of the toner accommodated in the toner cartridge 200 from an amount of the toner can be accommodated in the process housing 31.

If the controller 70 determines that the supply of the toner is necessary (step S6: YES), the toner supply accepting process is executed (step S7). On the other hand, if the controller 70 determines that the supply of the toner is not necessary (step S6: NO), the controller 70 displays on the panel 16 that the supply of the toner is not necessary (step S8).

The controller 70 then determines whether the supply section cover 13 is open or closed (step S9). If the controller 70 determines that the supply section cover 13 is located in the cover opened position (step S9: NO), the process of step S9 is repeated. If the controller 70 determines that the supply section cover 13 is positioned in the cover closed position (step S9: YES), the toner supply accepting process is terminated.

If the controller 70 detects that the supply section cover 13 is positioned in the cover closed position between steps S1 and S9, the controller 70 interrupts the process being executed and terminates the toner supply accepting process.

8. Toner Supply Accepting Process (Step S7)

Figure 12:
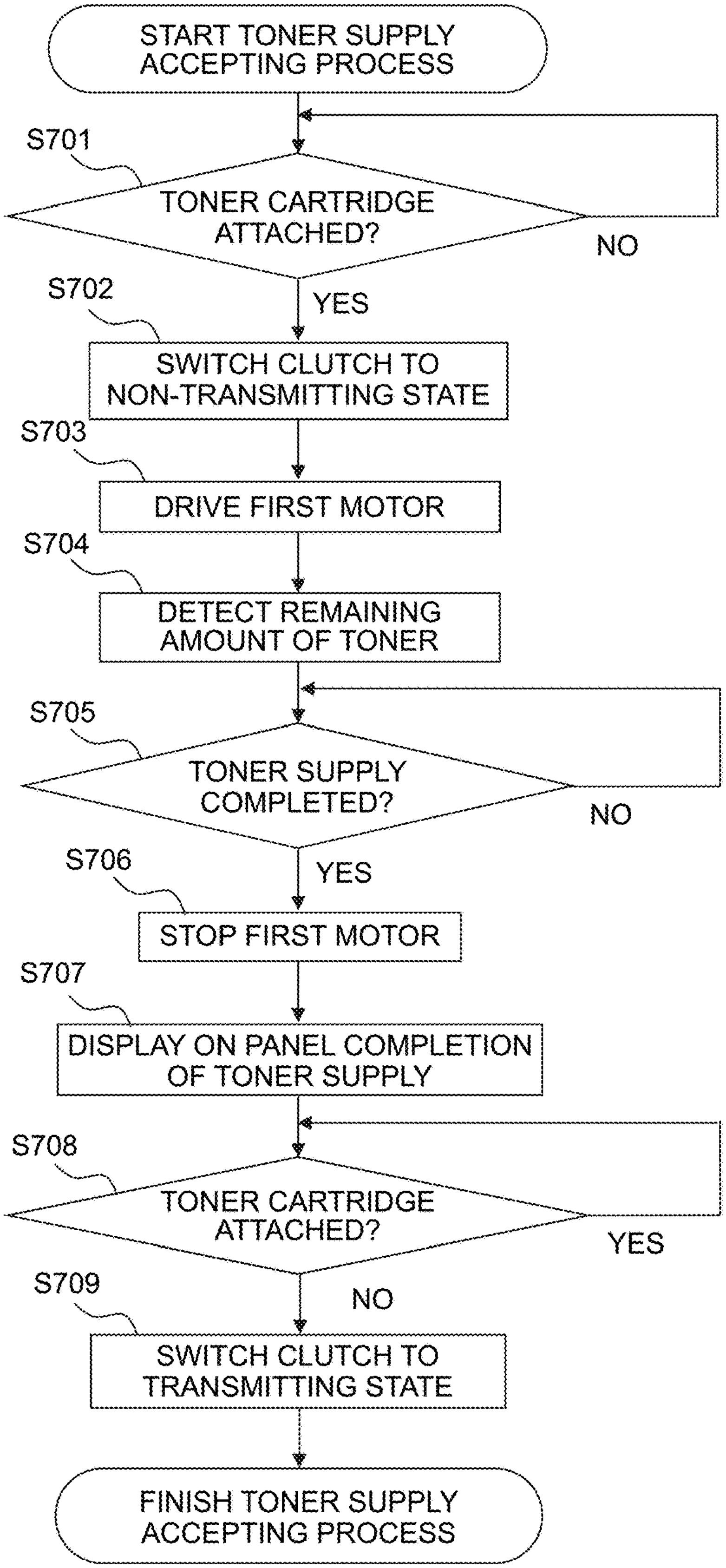
FIG. 12 is a flow chart depicting processes of step S7 in FIG. 11 in detail.

As depicted in FIG. 12, the controller 70 first determines whether the toner cartridge 200 has been attached to the process unit P1 (step S701). If the controller 70 determines that the toner cartridge 200 has been attached to the process unit P1 (step S701: YES), the controller 70 executes the first switching process to switch the electromagnetic clutch C1 from the transmission state to the non-transmission state (step S702). On the other hand, if the controller 70 determines that the toner cartridge 200 has not been attached to the process unit P1 (step S702: NO), the process of step S701 is repeated until the controller 70 determines that the toner cartridge 200 has been attached to the process unit P1.

The controller 70 then executes the first motor drive process to drive the first motor M1 (step S703). At this time, the electromagnetic clutch C1 is in the non-transfer state, so the driving force can be transmitted to the process coupling 36 without transmitting the driving force to the feeding roller 92. Thereby, the agitator 34 receives the driving force of the first motor M1 via the process coupling 36 and rotates. This causes the agitator 34 to rotate when the user attaches the toner cartridge 200 to the process unit P1 and supplies the process unit P1 with the toner.

The controller 70 then detects the remaining amount of the toner by TS (step S704) and determines whether the toner supply has been completed based on the detected remaining amount of the toner (step S705). If the controller 70 determines that the toner supply has not been completed (step S705: NO), the process of step S704 and the process of step S705 are repeated until the toner supply has been completed. To determine whether the toner supply has been completed, for example, the controller 70 determines whether the remaining amount of the toner in the process housing 31 has increased by the amount of the toner accommodated in the toner cartridge 200 from the remaining amount of the toner that has been detected before supply. The amount of the toner accommodated in the toner cartridge 200 is used in this embodiment by the controller 70 reading the information stored in the toner memory 260.

If the controller 70 determines that the toner supply has been completed (step S705: YES), the controller 70 executes the first motor stopping process (step S706) and displays on the panel 16 that the toner supply has been completed (step S707).

The controller 70 then determines whether the toner cartridge 200 is attached to the process unit P1 (step S708).

If the controller 70 determines that the toner cartridge 200 is attached to the process unit P1 (step S708: YES), the process of step S708 is repeated until the controller 70 determines that the toner cartridge 200 is not attached to the process unit P1. On the other hand, if the controller 70 determines that the toner cartridge 200 is not attached to the process unit P1 (step S709: NO), i.e., the toner cartridge 200 is detached from the process unit P1, the controller 70 executes the second switching process to switch the electromagnetic clutch C1 to the transmission state (step S709), and the toner supply accepting process is terminated.

9. Effect of Action

According to the embodiment described above, when the supply section cover 13 is in the cover opened position, the controller 70 can rotate the agitator 34 without rotating the feeding roller 92 by setting the electromagnetic clutch C1 to the non-transmission state. Thus, when the user supplies the process unit P1 with the toner, the toner accumulation in a part of the process housing 31 can be prevented. In addition, there is no need to provide separate motors to drive the feeding roller 92 and the agitator 34.

When the toner cartridge 200 is attached to the process unit P1, the electromagnetic clutch C1 can be set to the non-transmission state to allow the agitator 34 to rotate without rotating the feeding roller 92. Thus, when the user supplies the process unit P1 with the toner, the accumulation of the toner in the part of the process housing 31 can be prevented.

When the toner cartridge 200 is removed from the process unit P1, the controller 70 places the electromagnetic clutch C1 in the transmission state so that the first motor M1 can drive the feed roller 92 and agitator 34 after the user refills the process unit P1 with the toner.

The controller 70 can detect that the toner cartridge 200 has been attached to the process unit P1 by means of the main body electrical contacts 14. Therefore, there is no need to use a separate sensor to detect the toner cartridge 200, since the information in the toner memory 260 can be read out and the detection that the toner cartridge 200 has been attached to the process unit P1 is possible.

The toner memory 260 stores the amount of the toner accommodated in the toner cartridge 200, so the controller 70 can determine whether the toner supply from the toner cartridge 200 to the process unit P1 has been completed.

When the controller 70 detects that the supply section cover 13 is in the cover opened position, the controller 70 stops driving the first motor, and when the controller 70 detects that the toner cartridge 200 has been attached to the process unit P1, the controller 70 drives the first motor M1 after executing the first switching process. Therefore, the agitator 34 can be rotated when the toner cartridge 200 is attached to the process unit P1. In other words, the agitator 34 can be prevented from rotating when the toner cartridge 200 is not attached to the process unit P1, i.e., when the user is not refilling the toner from the toner cartridge 200 to process unit PT.

Since the controller 70 executes the stop process after the sheet being printed is discharged, there is no need for a jam process, unlike the case where the stop process is executed as soon as the supply section cover 13 is detected to be in the cover opened position.

Since the controller 70 stops the second motor M2 in the stop process, the agitator 34 can be rotated without rotating the discharge roller 94 and the pressure roller 82 when the supply section cover 13 is in the cover opened position. Further, since the fixing section 80 is driven by the second motor M2 that is separate from the first motor M1, the torque required for the first motor M1 is smaller than a case where the first motor M1 drives the agitator 34 and the fixing section 80.

10. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

In the embodiment described above, the process unit includes the agitator as an example of an agitating member, but it is not limited to this. For example, the process unit may include an auger capable of agitating the toner in the process housing as the agitating member.

In the embodiment described above, the first conveying roller is the feeding roller as an example, but it is not limited to this. For example, the first conveying roller may also be the discharge roller, the transfer roller, the registration roller, etc. In other words, the first conveying roller may include the discharge roller, the transfer roller, or the registration roller. In this case, the main housing includes the clutch that can switch between the transmission state in which the driving force is transmitted from the first motor to the first conveying roller such as the transfer roller and the registration roller, and a non-transmission state in which the drive force is not transmitted, so that, with the toner cartridge attached to the process unit, it is possible to rotate the agitator without driving the first conveying roller. In this case, the first conveying roller may or may not include the feeding roller.

In the embodiment described above, the electromagnetic clutch is used as an example of a clutch. However, the clutch is not limited to this, and any member that can switch between a state in which the driving force is transmitted and a state in which the driving force is not transmitted is acceptable. For example, instead of the electromagnetic clutch, the image forming apparatus may include a gear that can move between a position in which the driving force from the first motor is transmitted to the first conveying roller and a position in which the driving force from the first motor is not transmitted to the first conveying roller.

In the embodiment described above, the process unit has the process coupling and the main housing has the main coupling. However, for example, the process unit may have a process gear and the main housing may have a main gear that engages with the process gear.

In the embodiment described above, the controller executes the first switching process when the controller detects that the toner cartridge is attached to the process unit, but it is not limited to this. For example, the controller may execute the first switching process when the controller detects that the supply section cover is opened. Alternatively, the first switching process may be executed when the controller detects that the process shutter is moved to the first position.

In the embodiment described above, the first detecting section is the main body electrical contacts that can be electrically connected to the toner memory, but it is not limited to this. For example, the first detecting section may be a pressure-sensitive sensor or an optical sensor.

In the embodiment described above, the controller executes the second switching process when the controller does not detect that the toner cartridge is attached to the process unit. However, for example, the second switching process may be executed when the supply section cover is detected to be closed.

In the embodiment described above, the controller stops the driving of the first motor when the supply section cover is detected to be in the cover opened position, but it is not limited to this. For example, the clutch may be switched to the non-transmission state without stopping the driving of the first motor. This allows the agitator to be driven without driving the first conveying roller.

In the embodiment described above, the second detecting section is the optical sensor, but it is not limited to this. For example, the second detecting section may be a pressure-sensitive sensor.

In the embodiment described above, the second detecting section is configured to detect the protrusion of the supply section cover when the supply section cover is closed, but it is not limited to this. For example, the second detecting section may be configured to detect the protrusion with the supply section cover being opened.

In the embodiment described above, the controller executes the stop process of the first motor and the second motor, after the sheet being printed has been discharged, but it is not limited to this. For example, when the controller detects that the supply section cover has been opened, the controller may immediately execute the stop process without determining whether the printing is in progress. In this case, the user can immediately refill the toner without waiting for the sheet being printed to be discharged. Conversely, the controller may execute the stop process after all sheets of accepted print jobs have been discharged.

In the embodiment described above, the main housing includes the second motor, but it is not limited to this. For example, the main housing may not include the second motor, but the first motor may drive the fixing section, the discharge roller, and the like. In this case, the first conveying roller may also include a discharge roller and a pressure roller. In this case, by providing an electromagnetic clutch that can switch between a transmission state in which driving force is transmitted from the first motor to the first conveying roller, such as the discharge roller and the pressure roller, and a non-transmission state in which the driving force is not transmitted, it is possible to rotate the agitator without driving the first conveying roller when the toner cartridge is attached to the process unit.

In the embodiment described above, the process unit is a so-called integrated cartridge including the photosensitive drum and the developing roller, but it is not limited to this. For example, the process unit may be configured to include a drum cartridge having a photosensitive drum and a developing cartridge including a developing roller and being detachably attached to the drum cartridge.

Alternatively, the image forming apparatus may be configured to include a drum cartridge having a photosensitive drum and a developing cartridge having a developing roller and an agitating member, the developing cartridge being detachably attachable to the main housing independently of the drum cartridge. In this configuration, the developing cartridge including the developing roller and the agitating member is an example of the process unit.

In the embodiment described above, the process unit is detachably attachable to the main housing. However, for example, the process unit may not be detachable from the main housing.

In the embodiment described above, the toner memory is located on the nozzle, but it is not limited to this. For example, the toner memory may be located on the toner shutter.

In the embodiment described above, the image forming apparatus is the monochrome printer, but it is not limited to this. For example, the image forming apparatus may be a color printer including process units accommodating toner of black, magenta, yellow, cyan, and other colors, respectively. In such a case, it may be configured so that a toner cartridge corresponding to each process unit can be attached, or it may be configured so that a toner cartridge can be attached only for black, which is the most frequently used toner.

In the embodiment described above, the material of the toner container is assumed to be plastic, such as ABS, but it is not limited to this. For example, the material of the toner container may be a plastic bag. The material of the toner container may also be a paper container.

In the embodiment described above, the toner sensor is the optical sensor, but it is not limited to this. For example, the toner sensor may be a capacitance sensor that detects the capacitance of the toner in the process housing. The toner sensor may also be a torque sensor that detects an agitation torque. The remaining amount of the toner in the process housing may be predicted by dot counting without using the toner sensor.

In the embodiment described above, the fixing section includes the heating roller, but it is not limited to this. For example, instead of the heating roller, the fixing section may be a heating unit including a heater and an endless belt that can rotate around the heater.

Each of the elements described in the embodiment and the modifications described above can be combined as appropriate.

What is claimed is:

1. An image forming apparatus, comprising:

a main housing having a supply section opening, the main housing including: a first conveying roller configured to convey a sheet; and a supply section cover configured to open and close the supply section opening and configured to be movable between a cover opened position at which the supply section cover is opened and a cover closed position at which the supply section cover is closed;

a process unit including: a process housing configured to accommodate toner and having a toner receiving port; a developing roller; and an agitating member configured to agitate the toner in the process housing;

a toner cartridge configured to be attached to and detached from the process unit through the supply section opening and configured to supply the toner to the process unit, the toner cartridge having at least a part being exposed outside the main housing in a state of the toner cartridge being attached to the process unit; and a controller, wherein the main housing further comprises:

a first motor configured to drive the first conveying roller and the agitating member;

a clutch configured to be switched between a transmission state where driving force of the first motor is transmitted to the first conveying roller and a non-transmission state where the driving force of the first motor is not transmitted to the first conveying roller; and a first detecting section configured to detect the toner cartridge being attached to the process unit, and the controller is configured to execute:

a first switching process of switching the clutch from the transmission state to the non-transmission state in a case of the supply section cover being positioned in the cover opened position; and a first motor driving process of driving the first motor after the first switching process, wherein in a case where the first detecting section detects the toner cartridge being attached to the process unit with the supply section cover being positioned in the cover opened position, the controller is configured to execute the first switching process, and wherein in a case where the first detecting section does not detect the toner cartridge being attached to the process unit after the first switching process, the controller is configured to execute a second switching process of switching the clutch from the non-transmission state to the transmission state.

2. The image forming apparatus according to claim 1, wherein the main housing further comprises a sheet accommodating section configured to accommodate the sheet, and the first conveying roller includes a feeding roller configured to convey the sheet accommodated in the sheet accommodating section.

3. The image forming apparatus according to claim 1, wherein the process unit comprises a process coupling configured to receive the driving force of the first motor and configured to be rotated, the developing roller is configured to be rotated along with rotation of the process coupling, and the agitating member is configured to be rotated along with the rotation of the process coupling.

4. The image forming apparatus according to claim 1, wherein the first detecting section is a main body electrical contact to be electrically connected to the controller, the process unit further comprises:

a first process electrical contact configured to contact the first detecting section; and a second process electrical contact electrically connected to the first process electrical contact, the toner cartridge further comprises a toner memory having a toner electrical contact, the toner electrical contact being configured to contact the second process electrical contact in the state of the toner cartridge being attached to the process unit, the first detecting section is electrically connectable to the toner memory via the first process electrical contact, the second process electrical contact, and the toner electrical contact, and in a case where the controller is electrically connected to the toner memory, the controller is configured to determine that the toner cartridge has been attached to the process unit.

5. The image forming apparatus according to claim 4, wherein the toner memory is configured to store an amount of the toner accommodated in the toner cartridge.

6. The image forming apparatus according to claim 1, wherein the main housing further comprises a second detecting section configured to detect opening and closing of the supply section cover, and the controller is configured to execute:

a stopping process of stopping driving of the first motor in a case where the controller determines that the supply section cover is in the cover opened position based on the second detecting section;

the first switching process, in a case where the first detecting section detects the toner cartridge being attached to the process unit after the stopping process; and the first motor driving process of driving the first motor after the first switching process.

7. The image forming apparatus according to claim 6, wherein the second detecting section is an optical sensor.

8. The image forming apparatus according to claim 6, wherein in a case where the second detecting section detects the supply section cover being in the cover opened position during forming an image on the sheet, the controller is configured to discharge the sheet on which the image is being formed and then execute the stopping process.

9. The image forming apparatus according to claim 6, wherein the main housing further comprises:

a second conveying roller configured to convey the sheet; and a second motor configured to drive the second conveying roller, and the controller is configured to stop driving of the second motor in the stopping process.

10. The image forming apparatus according to claim 9, further comprising a fixing section, wherein the second motor is configured to transmit driving force to the fixing section.

11. The image forming apparatus according to claim 9, wherein the second conveying roller includes a discharging roller configured to discharge the sheet, on which an image has been formed, outside the main housing.

12. The image forming apparatus according to claim 1, wherein the first conveying roller includes a discharging roller configured to discharge the sheet, on which an image has been formed, outside the main housing.

13. The image forming apparatus according to claim 1, wherein the clutch is an electromagnetic clutch.

* * * * *